(12) United States Patent
Geislinger et al.

(10) Patent No.: US 7,677,980 B2
(45) Date of Patent: Mar. 16, 2010

(54) MEMBRANE COMPENSATING COUPLING AND HOLE ANCHOR CONNECTION

(75) Inventors: Cornelius Geislinger, Salzburg (AT); Matthias Geislinger, Salzburg (AT)

(73) Assignee: Geislinger GmbH, Hallwang (AT)

( * ) Notice: Subject to any disclaimer, the term of this patent is extended or adjusted under 35 U.S.C. 154(b) by 132 days.

(21) Appl. No.: 11/774,612

(22) Filed: Jul. 9, 2007

(65) Prior Publication Data

US 2008/0064510 A1    Mar. 13, 2008

(30) Foreign Application Priority Data

Sep. 8, 2006    (DE) ................ 10 2006 042 301

(51) Int. Cl.
    *F16D 3/68* (2006.01)
(52) U.S. Cl. .......................... 464/92; 464/80
(58) Field of Classification Search ............. 464/87–88, 464/92–96, 98–99, 101, 900, 80
    See application file for complete search history.

(56) References Cited

U.S. PATENT DOCUMENTS

| 4,802,882 | A | * | 2/1989 | Heidrich ...................... 464/99 |
| 4,938,325 | A | * | 7/1990 | Nakagawa |
| 5,314,382 | A | | 5/1994 | Pfeifer |
| 5,364,309 | A | * | 11/1994 | Heidrich et al. ............... 464/99 |
| 5,551,918 | A | | 9/1996 | Jones et al. |
| 5,855,462 | A | | 1/1999 | Weiss |
| 6,095,924 | A | | 8/2000 | Geislinger |
| 6,168,527 | B1 | | 1/2001 | Geislinger |
| 6,186,019 | B1 | * | 2/2001 | Hagedorn et al. ............. 464/92 |
| 6,669,569 | B2 | | 12/2003 | Geislinger |
| 2005/0085303 | A1 | | 4/2005 | Geislinger et al. |

FOREIGN PATENT DOCUMENTS

| AT | 395900 B | 3/1993 |
| AT | 403837 B | 10/1997 |
| AT | 409532 B | 9/2002 |
| DE | 19625318 A1 | 1/1998 |
| DE | 19912797 A1 | 9/2000 |
| EP | 0953782 A2 | 11/1999 |
| EP | 1526299 A1 | 4/2005 |

* cited by examiner

*Primary Examiner*—Greg Binda
(74) *Attorney, Agent, or Firm*—Myers Wolin, LLC

(57) ABSTRACT

A membrane compensating coupling comprises a first compensating element made of fiber composite material with two membranes located opposite one another, a second compensating element and an intermediate tube inserted between these. The first and second compensating element in each case have on their side pointing towards the intermediate tube a radially inwardly directed connecting flange. The intermediate tube is releasably coupled to the connecting flanges. As a result, a membrane compensating coupling comprising at least two membranes made of fiber composite material is provided, which is easy to produce and install, at the same time has low inertias and allows large angle, radial and axial compensation and also a flexible axial length. A hole anchor connection which is particularly suitable for such couplings is also described.

13 Claims, 4 Drawing Sheets

MEMBRANE COMPENSATING COUPLING AND HOLE ANCHOR CONNECTION

FIELD OF THE INVENTION

The invention relates to the field of membrane compensating couplings made of fibre composite material. The invention also relates to a hole anchor connection for the coupling of flanges made of fibre composite material, which is particularly suitable for use in membrane compensating couplings.

BACKGROUND

Via at least one deformable membrane made of fibre composite material, membrane compensating couplings allow the compensation of angle and length deviations which occur between rotating machine elements during operation, for example an output element of an engine and an input element of a driven unit, for example a transmission. Since the service life of a membrane made of fibre composite material depends greatly on the deformations occurring thereon, a misalignment of the machine elements to be coupled should as far as possible be avoided in the static installed state. Accordingly, compensating couplings comprising membranes made of fibre composite material are preferably used wherever a drive unit mounted elastically to isolate vibrations has to be connected to a fixed transmission or a subsequent drive train. The dynamic changes in the alignment angle and in the distance between the machine elements to be coupled which occur here are compensated by a curving of the membrane. In the radial direction, on the other hand, a membrane is relatively rigid. To compensate large radial displacements, at least two membranes at the greatest possible axial spacing are required.

A one-piece membrane compensating coupling made of fibre composite material is known from AT 395 900 B. This coupling comprises two pre-manufactured membranes which are permanently connected via a tube section. However, the necessary adhesive bonding of the membranes to the tube section using an additional sleeve is extremely complicated in manufacturing terms and therefore cannot take place at the installation site. Moreover, the axial length of such couplings which can be handled is often very greatly restricted due to the spatial conditions at the installation site, such as for example in the engine room of a ship. Since such couplings are usually installed after the drive unit or the transmission, in the case of larger spacings a coupling according to AT 395 900 B can no longer be brought to the installation site or can be brought there only with great difficulty or cannot be removed again without being destroyed. Furthermore, due to the fact that the fixing elements are located radially far out, relatively high inertias occur, which are usually undesirable with regard to torsion vibrations.

A further membrane compensating coupling is known from AT 403 837 B. This comprises two compensating elements, in each case comprising a deformable membrane made of fibre composite material, on the outer circumference of which a tube section is integrally formed. The two tube sections are releasably connected to one another via fixing screws. However, due to manufacturing reasons, such membrane compensating couplings can be produced only with a small axial length, since the membranes are usually produced manually. Moreover, as in the coupling according to AT 395 900 B, relatively high mass moments of inertia occur on account of the fact that the fixing elements are located radially far out.

It is also proposed in AT 403 837 B to pre-manufacture the membrane parts and tube sections as individual parts and then to connect them by means of adhesive bonding or screwing to form a construction unit. In the first-mentioned case, this again leads to a considerable manufacturing complexity, while in the last-mentioned case the mass moments of inertia increase further.

Finally, a membrane compensating coupling according to the preamble of claim 1 is known from EP 1 526 299 A1. In this case, too, use is made of two separate compensating elements made of fibre composite material. Each compensating element comprises a deformable membrane and a stiffer membrane located opposite the first. Both membranes are integrally connected to one another at their outer circumference. Moreover, a tube section is integrally formed on the stiffer membranes, which tube section forms at its free end a radially outwardly directed connecting flange. The two tube sections are releasably connected to one another at the connecting flanges by means of fixing screws. In the assembled state, this coupling is installed for example between a drive unit and a transmission. In order to permit fixing of the compensating elements to corresponding flanges of a drive unit and a unit to be driven from the side of the coupling, the respective outer membrane has fixing openings and the further membrane has through-openings located in front of these. This design permits lower mass moments of inertia; however, the axial length of the coupling and thus also the possibility of compensating large radial and angle changes is limited for manufacturing reasons. The shape of the compensating elements is furthermore very complicated to produce.

SUMMARY

Against this background, the object of the invention is to provide a membrane compensating coupling comprising at least two membranes made of fibre composite material, which is easy to produce and install, at the same time has low mass moments of inertia and allows large angle, radial and axial compensation and also a flexible axial length.

This object is achieved by a membrane compensating coupling according to claim 1. The coupling according to the invention comprises a first compensating element made of fibre composite material with two membranes located opposite one another, and a second compensating element. It is characterized in that an intermediate tube is inserted between the first compensating element and the second compensating element, the first compensating element forms a radially inwardly directed connecting flange on its side pointing towards the intermediate tube, the second compensating element has a radially inwardly directed connecting flange on its side pointing towards the intermediate tube, and the intermediate tube is releasably coupled to the connecting flanges of the first and second compensating element.

Compared to the couplings mentioned above, the coupling according to the invention allows a smaller outer diameter for the same torque and maximum permissible angle error. Due to the modular design with two compensating elements and an intermediate tube connecting these, and also the arrangement of the connecting flanges, components are obtained which are of an easy-to-produce shape and can be easily made from fibre composite materials. The mass moments of inertia also remain low.

Due to the double membrane, a good bending behaviour is also achieved with sufficient protection against dents, so that large angle errors can be compensated even with a relatively short axial length. Furthermore, by means of the intermediate tube, the length of the coupling can be adapted as required to the respective installation situation, without the compensating elements having to be modified.

The aforementioned modular design also allows easy installation even in restricted space conditions. Due to its simple structure, the coupling can be inserted without any problem between machine elements already in their installed position. By virtue of a suitable configuration, installation and removal of the two compensating elements on the respective machine element from the side of the coupling is possible. The weight of the individual components is no more than that which can be carried by hand, even for use in ships' drives, so that it can be brought on site without the need for lifting devices. The time taken to install and remove a membrane compensating coupling is thus considerably reduced.

Further advantageous embodiments of the invention are specified in the claims.

According to one advantageous embodiment, the compensating elements and the intermediate tube are configured in such a way that the intermediate tube can be introduced in the radial direction between the first and second compensating elements already in the installed position. In this case, the two compensating elements can in each case be fixed from the side of the coupling to corresponding flanges of the engine and of the transmission. This creates a maximum axial length between the membranes and thus a high compensating capability of the coupling with regard to dynamic alignment errors. Furthermore, as a result, the space requirement for the connection on the engine and transmission side remains minimal.

By contrast, if the intermediate tube is passed through a flexible bulkhead seal, it is advantageous firstly to install the intermediate tube and one of the compensating elements. The remaining compensating element can then be brought into its connection position against the intermediate tube by means of a movement in the radial direction. However, in this case, the fixing of the compensating element has to take place from outside if the membranes are not to be weakened by access openings as described in EP 1 526 299 A1 and increased mass moments of inertia due to large connection flanges are not to be accepted.

For the radial installation of the intermediate tube and of one of the compensating elements, it is advantageous to form the intermediate tube with radially outwardly directed connecting flanges at its ends for connection to the connecting flanges of the compensating elements. Preferably, the intermediate tube is made in one piece from fibre composite material, as a result of which the weight of the component remains low even in the case of large axial lengths. For any bulkhead seal, in one advantageous embodiment a metal or plastic ring may be arranged in a stationary manner for sealing purposes on the outer circumference of the intermediate tube.

The connection of the intermediate tube to a compensating element for the purpose of transmitting torque takes place by means of hole anchor connections in order to avoid stresses in the fibre composite material in the region of the connecting flanges. To this end, the latter are provided with fixing openings, into which a sleeve of a hole anchor connection extends in each case.

Preferably, for this, use is made of a hole anchor connection according to the invention for flanges made from fibre composite material, which comprises a sleeve for passing through corresponding openings on the flanges to be connected, wherein the sleeve at one end forms a radial collar. Furthermore, the hole anchor connection comprises a mating holder with a radial collar and a retaining screw for axially securing the sleeve to the mating holder. The flanges to be connected can be held between the two collars. Since no torque is transmitted via the retaining screws, these can be designed to be very small and therefore lightweight, which is advantageous with regard to the mass moments of inertia.

According to one advantageous embodiment, one or more spacer rings may be arranged on the sleeve. Via these, relatively small deviations in the spacing between the machine elements to be coupled can be compensated in the hole anchor connections during installation, so that the membranes are largely undeformed in the static installed state. This is advantageous with regard to a long service life of the coupling.

Furthermore, one or more threaded through-openings may be formed on the collar of the sleeve, wherein at the same time a disc is arranged directly under the collar on the sleeve. On the one hand, by the screwing-in of threaded bolts, this allows easy removal of the sleeve and on the other hand a rough axial length compensation of the coupling can take place by swapping the position in the case of a different axial length of the disc and spacer rings.

According to a further advantageous embodiment of the invention, the membranes of a compensating element which are located opposite one another are integrally connected to one another at their outer circumference. In this case, the membranes located opposite one another may have in each case one or more curvatures in their main extension plane, as a result of which the deformation potential is increased. Moreover, the membranes located opposite one another may be electrically insulated from one another by the embedding of non-conductive fibre components, so as largely to suppress for example the flow of leakage currents.

For simple installation and removal, it is furthermore advantageous if the first compensating element forms on its side facing away from the intermediate tube a preferably radially inwardly directed connecting flange with a plurality of fixing openings, and these fixing openings are accessible through a central opening in the opposite connecting flange on the intermediate tube side.

In principle, the first and second compensating element may be of identical design. In this case, the second compensating element has as an integral component made of fibre composite material at least two membranes which are located opposite one another and which in each case form a preferably radially inwardly directed connecting flange. However, it is also possible to use as the second compensating element a coupling member as described in AT 409 532 B, which comprises an elastomeric body which joins together two annular membranes made of fibre composite material. In this case, preferably a radially inwardly directed connecting flange is formed on the membrane on the intermediate tube side.

In order to attenuate axial vibrations, according to a further advantageous embodiment a disc with a magnet may be inserted between one compensating element and the intermediate tube, wherein the magnet is arranged within the compensating element and/or the intermediate tube and cooperates with a magnetic counterpart on the engine or transmission.

BRIEF DESCRIPTION OF THE DRAWINGS

The invention will be explained in more detail below on the basis of examples of embodiments shown in the drawing. In the drawing.

DETAILED DESCRIPTION OF THE PREFERRED EMBODIMENTS

Figure 1:
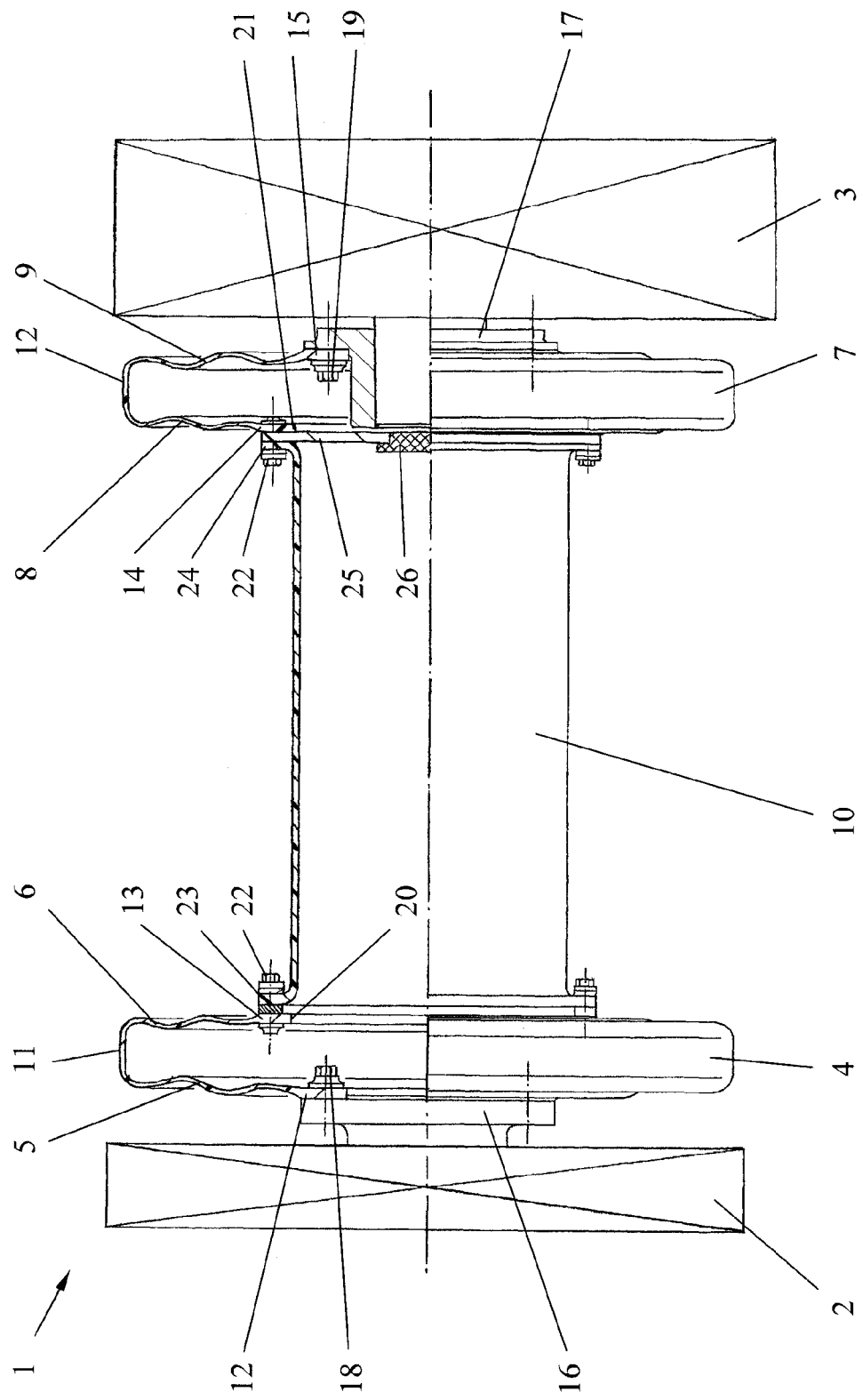
FIG. 1 shows a partial sectional view of a membrane compensating coupling according to a first example of embodiment of the invention.

The first example of embodiment shows a membrane compensating coupling 1 in the installed state between an elastically mounted engine 2 and a driven unit 3. The coupling 1 is of modular construction and consists of three components. It comprises a first compensating element 4 with two membranes 5 and 6 located opposite one another, a second compensating element 7 with two membranes 8 and 9 located opposite one another, and an intermediate tube 10 inserted between these. Each of these components is produced as an integral component made of fibre composite material. The compensating elements 4 and 7 are in each case produced with glass and/or carbon fibres embedded in resin, depending on the intended use. Although the maximum axial length of the compensating elements 4 and 7 is limited for manufacturing reasons, a length adaptation to the respective installation situation can be performed via the intermediate tube 10.

The membranes 5 and 6 and respectively 8 and 9 of the compensating elements 4 and 7 are connected to one another at their outer circumference by an essentially cylindrical connecting section 11 and 12. Electrical insulation can be achieved by the embedding of non-conductive fibre components. To this end, preferably exclusively non-conductive fibres such as glass fibres are used in the region of the connecting sections 11 and 12. Furthermore, the membranes 5 and 6 and 8 and 9 are provided with curvatures in order to increase the deformation capability and reduce the reaction forces compared to a flat membrane. The membranes form radially inwardly directed connecting flanges 12, 13, 14 and 15 on their inner circumference. These connecting flanges 12, 13, 14 and 15 in each case have a plurality of fixing openings. On the whole, a simple shape which is independent of the required axial length of the coupling is thus obtained, which leads to considerable manufacturing advantages.

As shown in FIG. 1, the compensating elements 4 and 7 are fixed to corresponding flanges 16 and 17 of the engine 2 and of the driven unit 3 by means of pre-tightened fixing screws 18 and 19 from the side of the coupling 1, wherein the transmission of torque to the respective connecting flanges 12 and 15 takes place via the hole anchor connections of the fixing openings. The connecting flanges 12 and 15 are drawn radially further inwards than the connecting flanges 13 and 14 on the intermediate tube side, so that the fixing screws 18 and 19 are accessible through central openings 20 and 21 of the connecting flanges 13 and 14 on the intermediate tube side.

The intermediate tube 10 is releasably coupled to the last-mentioned connecting flanges 13 and 14 via hole anchor connections 22 which will be explained in more detail below. The intermediate tube 10 has in each case radially outwardly directed connecting flanges 23 and 24 at its two ends, which connecting flanges are provided with a plurality of fixing openings. If the compensating elements 4 and 7 are already in their installed position, the intermediate tube 10 can be inserted radially between these until the respective connecting flanges 13 and 23 and 14 and 24 lie opposite one another. A coupling which is almost free of any axial force then takes place via the hole anchor connections 22. These provide rough axial distance compensation and thus allow an essentially stress-free installation of the membranes 5 and 6 and 8 and 9.

This furthermore allows easy handling and installation, since the individual components can be brought to the site of use separately and without lifting tools, even in the case of tight machine spaces. Furthermore, due to the fixing from the side of the coupling, the distance between the engine 2 and the unit 3 to be driven can be optimally used to keep the maximum dynamic radial and angle errors small.

Furthermore, as shown in FIG. 1, a disc 25 with a magnet 26 can be inserted between one compensating element 7 and the intermediate tube 10. The magnet 26 is in this case located within the coupling 1 and lies opposite a section of the flange 17 of the unit 3 to be driven which protrudes into the compensating element 7. As a result, any axial vibrations which occur can be attenuated.

Figure 2:
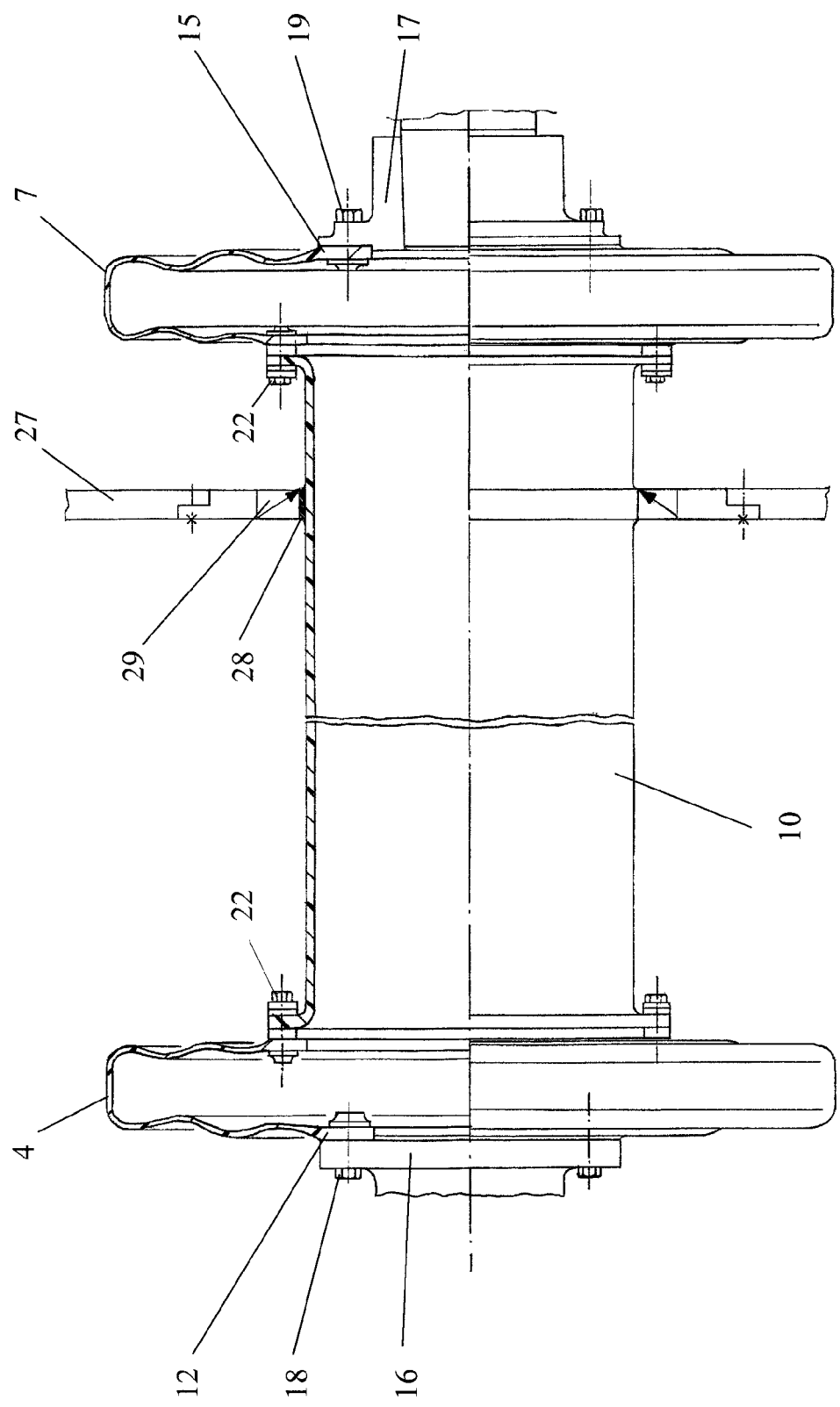
FIG. 2 shows a partial sectional view of a membrane compensating coupling according to a second example of embodiment with a bulkhead seal.

A second example of embodiment of a membrane compensating coupling is shown in FIG. 2, the compensating elements 4 and 7 of which are designed in the same way as in the first example of embodiment. In the case of long distances between the engine and the transmission, the intermediate tube 10 sometimes has to be passed through a bulkhead wall 27. In this case, a somewhat raised metal or plastic ring 28 is additionally provided on the outer circumference of the intermediate tube 10 made of fibre composite material, which ring forms a flexible sliding seal with a radially split sealing ring 29 attached to the bulkhead wall 27.

During installation, firstly the intermediate tube 10 is installed in this case. Only then are the compensating elements 4 and 7 radially moved into their connection position. The connection to the intermediate tube 10 takes place in the same way as in the first example of embodiment. Since the connecting flanges 12 and 15 facing away from the intermediate tube 10 are no longer accessible from the side of the coupling, a sufficient installation space for the fixing screws 18 and 19, which are now installed the opposite way round, must be provided in the region of the flanges 16 and 17 of the engine 2 and of the unit 3 to be driven.

Figure 3:
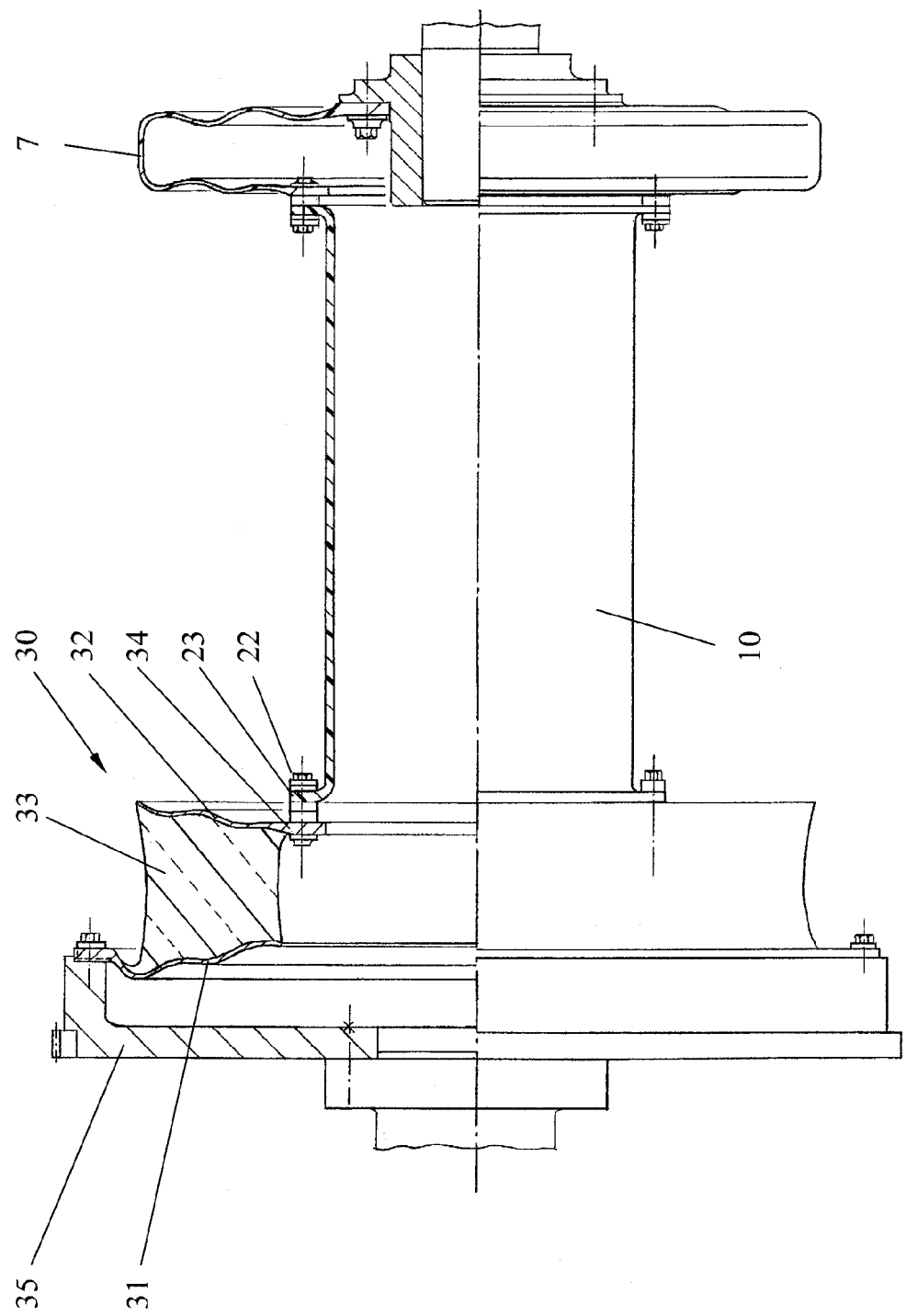
FIG. 3 shows a partial sectional view of a membrane compensating coupling according to a third example of embodiment with a modified second compensating element.

As shown in FIG. 3 on the basis of a third example of embodiment, one of the compensating elements may be designed as an elastomeric coupling member 30. The elastomeric coupling member 30 comprises two annular membranes 31 and 32 which in each case may be made from a fibre composite material and may be provided with curvatures. An elastomeric body 33 is inserted between the membranes 31 and 32 and is preferably vulcanized onto these. The membrane 32 facing towards the intermediate tube 10 has a radially inwardly directed connecting flange 34, which is designed in the same way as the connecting flanges 13 and 14 of the first two examples of embodiments. Here, too, the connection to the intermediate tube 10 takes place via hole anchor connections 22. In the illustrated example of embodiment, the further membrane 31 is fixed at its outer edge to an intermediate flange 35 which can be coupled to the output element of an engine or to the input element of a unit to be driven. However, it is also possible, instead of an intermediate flange 35, to connect the membrane 31 like the membranes 5 and 9 of the first two examples of embodiments to an engine or to a unit to be driven and to this end to design it with a radially inwardly directed connecting flange, as a result of which installation from the side of the coupling is possible.

Figure 4:
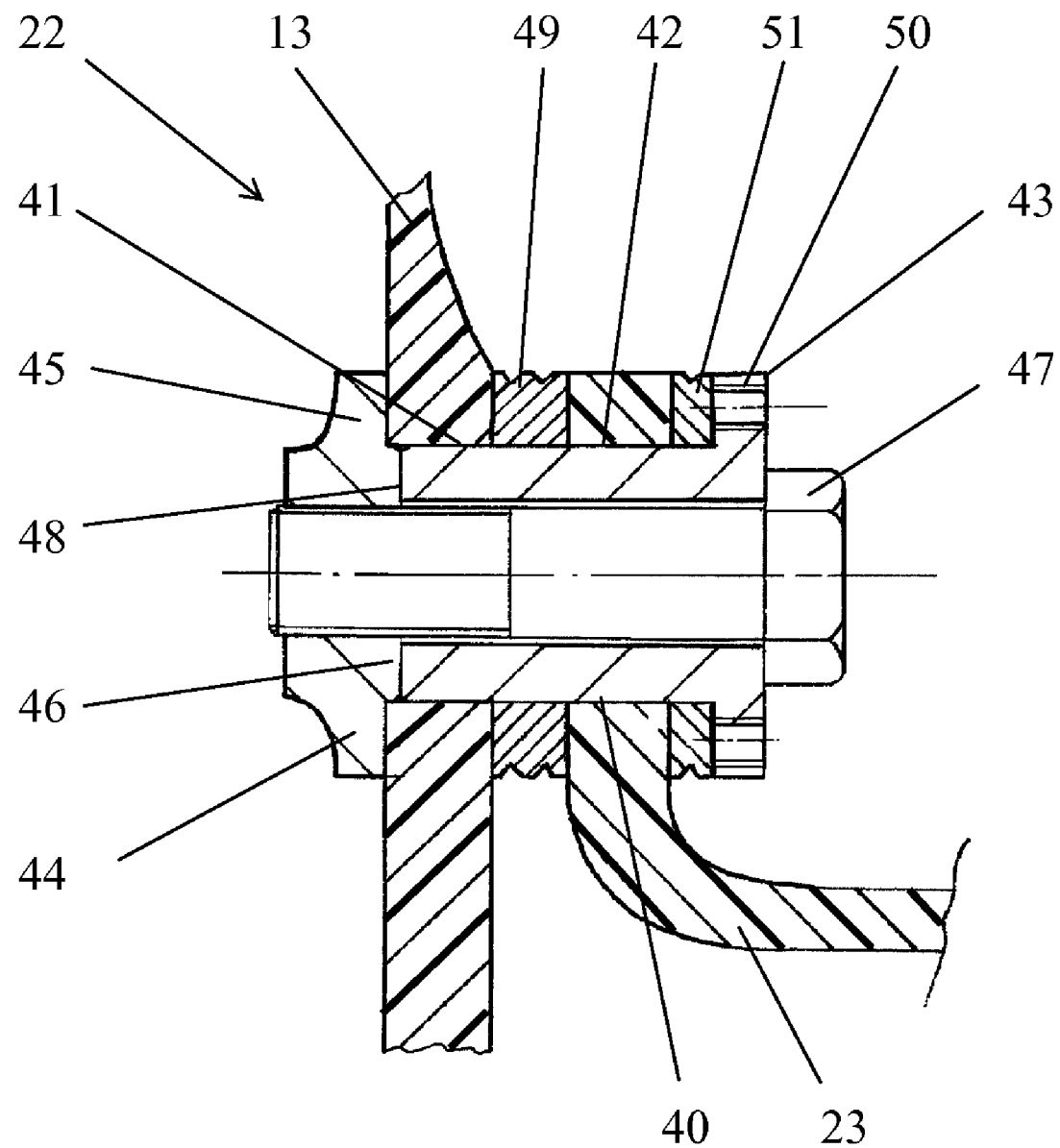
FIG. 4 shows a sectional view of an example of embodiment of a hole anchor connection according to the invention.

FIG. 4 shows a hole anchor connection 22 for flanges made from fibre composite material, as used in the membrane compensating couplings 1 described above. The hole anchor connection 22 comprises a sleeve 40 which extends into corresponding openings 41 and 42 on the flanges to be connected, for example the connecting flanges 13 and 23. The sleeve 40 forms a radial collar 43 at one end. Furthermore, the hole anchor connection 22 comprises a mating holder 44 with a radial collar 45. The mating holder 44 can extend with an annular projection 46 into one of the openings 41 or 42 and can be fixed to the respective flange so as to prevent detachment. Also provided is a retaining screw 47 for axially securing the sleeve 40 to the end wall 48 of the mating holder 44. During assembly of the hole anchor connection 22, the sleeve 40 is introduced into the openings 41 and 42. Here, one or more spacer rings 49 may additionally be arranged on the outer circumference of the sleeve 40 for the purpose of axial length compensation. The sleeve 40 is then clamped axially against the mating holder 44 by means of the retaining screw 47. Since no torque is transmitted via the retaining screw 47 and the latter serves only for axial securing purposes, it can be designed to be relatively small and therefore lightweight. In the assembled state, the flanges 13 and 23 to be connected and also any spacer rings 49 that are present are arranged between the collars 43 and 45 without any appreciable axial clamping. The distance between the flanges 13 and 23 can be adjusted via the axial length of the spacer rings 49.

In the illustrated example of embodiment, a plurality of threaded through-openings 50 are provided on the collar 43 of the sleeve 40. Moreover, a disc 51 made of metal is arranged directly under the collar 43 on the sleeve 40. As a result, during disassembly by means of threaded bolts, the sleeve 40 inserted with a tailored fit in the openings 41 and 42 can be pushed out of the flanges. Furthermore, rough adjustment of the axial length compensation may take place by a different axial length of the spacer rings 49 and discs 51 by swapping the position.

The invention has been described in detail above on the basis of examples of embodiments. However, it is not restricted to these examples of embodiments but rather encompasses all the embodiments defined by the claims.

We claim:

1. A membrane compensating coupling, comprising:
    a first compensating element produced as an integral component made of fibre composite material with two membranes located opposite one another and being integrally connected to one another at their outer circumference,
    a second compensating element, and
    an intermediate tube made in one piece from fibre composite material, inserted between and connecting the first compensating element and the second compensating element,
    wherein the first compensating element forms a first radially inwardly directed connecting flange on its side pointing towards the intermediate tube,
    the first compensating element forms on its side facing away from the intermediate tube a second radially inwardly directed connecting flange, wherein the second radially inwardly directed connecting flange is drawn radially further inwards than the first radially inwardly directed flange,
    the second compensating element has a radially inwardly directed connecting flange on its side pointing towards the intermediate tube, and
    the intermediate tube is releasably coupled to the first radially inwardly directed connecting flange of the first compensating element and to the radially inwardly directed connecting flange of the second compensating element.

2. The membrane compensating coupling according to claim 1, wherein the intermediate tube has at its ends radially outwardly directed connecting flanges for connection to the connecting flanges of the compensating elements.

3. The membrane compensating coupling according to claim 1, wherein the adjacent connecting flanges of the intermediate tube and of the first compensating element are connected by means of hole anchor connections in order to transmit a torque, said hole anchor connections in each case comprising a sleeve which extends into corresponding fixing openings on the connecting flanges.

4. The membrane compensating coupling according to claim 3, wherein the hole anchor comprises:
    a sleeve for passing through corresponding openings on the flanges to be connected, wherein the sleeve forms a radial collar at one end,
    a mating holder with a radial collar, and
    a retaining screw for axially clamping the sleeve against the mating holder,
    wherein the flanges to be connected can be held between the two collars.

5. The membrane, compensating coupling according to claim 1, wherein, in the installed position of the intermediate tube, the first compensating element can be brought into a connection position against the intermediate tube by a movement in the radial direction.

6. The membrane compensating coupling according to claim 1, wherein a metal or plastic ring is arranged in a stationary manner on the outer circumference of the intermediate tube.

7. The membrane compensating coupling according to claim 1, wherein, in the installed position of the first and second compensating element, the intermediate tube can be introduced in the radial direction between the first and second compensating element.

8. The membrane compensating coupling according to claim 1, wherein the membranes located opposite one another in each case have one or more curvatures.

9. The membrane compensating coupling according to claim 1, wherein the membranes located opposite one another are electrically insulated from one another by the embedding of non-conductive fibre components.

10. The membrane compensating coupling according to claim 1, wherein the second radially inwardly directed connecting flange further comprises a plurality of fixing openings that are accessible through a central opening in an opposite connecting flange on the intermediate tube side.

11. The membrane compensating coupling according to claim 1, wherein a disc with a magnet is inserted between one compensating element and the intermediate tube, wherein the magnet is arranged within the coupling.

12. The membrane compensating coupling according to claim 1, wherein the second compensating element is designed as an integral component made of fibre composite material with two membranes located opposite one another and radially inwardly directed connecting flanges.

13. The membrane compensating coupling according to claim 1, wherein one or both compensating elements comprise an elastomeric body which joins together two annular membranes made of fibre composite material.

* * * * *